United States Patent [19]
Whited et al.

[11] Patent Number: 5,912,954
[45] Date of Patent: Jun. 15, 1999

[54] METHOD AND SYSTEM FOR PROVIDING BILLING INFORMATION IN A TELECOMMUNICATIONS NETWORK

[75] Inventors: John L. Whited, Richardson; Hung V. Le, Fort Worth; Charles C. Lee, Jr., Plano, all of Tex.

[73] Assignee: Alcatel USA Sourcing, L.P., Plano, Tex.

[21] Appl. No.: 09/001,622

[22] Filed: Dec. 31, 1997

Related U.S. Application Data

[60] Provisional application No. 60/039,676, Feb. 28, 1997.

[51] Int. Cl.$^6$ .................................................. H04M 15/00
[52] U.S. Cl. .......................... 379/115; 379/119; 379/127; 379/116; 379/230; 379/91.02
[58] Field of Search .............................. 379/91.01, 91.02, 379/112, 115, 114, 116, 119, 121, 127, 207, 126, 230, 229

[56] References Cited

U.S. PATENT DOCUMENTS

| | | | |
|---|---|---|---|
| 5,008,929 | 4/1991 | Olsen et al. | 379/112 |
| 5,163,087 | 11/1992 | Kaplan | 379/91.01 |
| 5,313,463 | 5/1994 | Gore et al. | 379/91.01 |
| 5,640,446 | 6/1997 | Everett et al. | 379/115 |

FOREIGN PATENT DOCUMENTS

| | | | |
|---|---|---|---|
| 9631973 | 10/1996 | WIPO | H04M 11/00 |
| 9723100 | 6/1997 | WIPO . | |

OTHER PUBLICATIONS

Abdi R. Modarressi, et al., "An Overview of Signaling System No. 7", Proceedings of the IEEE, vol. 80, No. 4, Apr. 1, 1992, pp. 590–606.

Patent Abstracts of Japan, vol. 015, No. 185 (E–1066), May 13, 1991 & JP 03 045068 A (NEC Corp), Feb. 26, 1991.

*Primary Examiner*—Paul Loomis
*Attorney, Agent, or Firm*—Baker & Botts, L.L.P.

[57] ABSTRACT

A method for generating billing information for a call in a telecommunications network is disclosed. In one embodiment, a call initiation stimulus is received at a service switching system (112). The service switching system (112) notifies a service control system (104) of the call initiation stimulus. The service control system (104) generates a first TCAP connect message with a destination routing address portion having a billing information tag and customer billing information. The first TCAP connect message is transmitted to the service switching system (112), which transmits a response message to the service control system (104). The service control system (104) transmits a second TCAP connect message to the service switching system (112) in response to the response message. The service switching system (112) generates a billing record in response to the first TCAP connect message. The method provides for the generation and storing of billing information using standard SS7 signaling, message protocols and call detail record formats, and using any proprietary switch.

7 Claims, 3 Drawing Sheets

METHOD AND SYSTEM FOR PROVIDING BILLING INFORMATION IN A TELECOMMUNICATIONS NETWORK

CROSS REFERENCE TO RELATED APPLICATIONS

This application claims the benefit of U.S. Provisional Application No. 60/039,676 filed on Feb. 28, 1997, which is incorporated herein by reference.

TECHNICAL FIELD OF THE INVENTION

This invention relates generally to the field of telecommunications and more particularly to a method and system for providing billing information in a telecommunications network.

BACKGROUND OF THE INVENTION

In intelligent networks, various techniques may be used to track billing information and generate bills for customers. These techniques are typically unique to the type of switch employed in the network. Moreover, known methods typically employ non-standard, switch-dependent messaging to transmit billing information. These switch-dependent methods require significant and costly modification to the network to accommodate the particular billing solution implemented for the switch deployed in the network. In addition, these switch-dependent solutions are not portable across networks.

SUMMARY OF THE INVENTION

Therefore, a need has arisen for a method and system for providing billing information in a telecommunications network that address the disadvantages and deficiencies of the prior art.

A method for generating billing information for a call in a telecommunications network is disclosed. In one embodiment of the present invention, a call initiation stimulus is received at a service switching system. The service switching system notifies a service control system of the call initiation stimulus. The service control system generates a first TCAP connect message with a destination routing address portion having a billing information tag and customer billing information. The first TCAP connect message is transmitted to the service switching system, which transmits a response message to the service control system. The service control system transmits a second TCAP connect message to the service switching system in response to the response message. The service switching system generates a billing record in response to the first TCAP connect message.

A technical advantage of the present invention is that the method provides for the generation and storing of billing information using standard SS7 signaling, message protocols and call detail record formats. Another technical advantage is that minimal changes to a telecommunications network are required to accommodate this billing method. Yet another technical advantage is that any proprietary switch may be used in a telecommunications network that implements the billing method.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OR THE INVENTION

Figure 1:
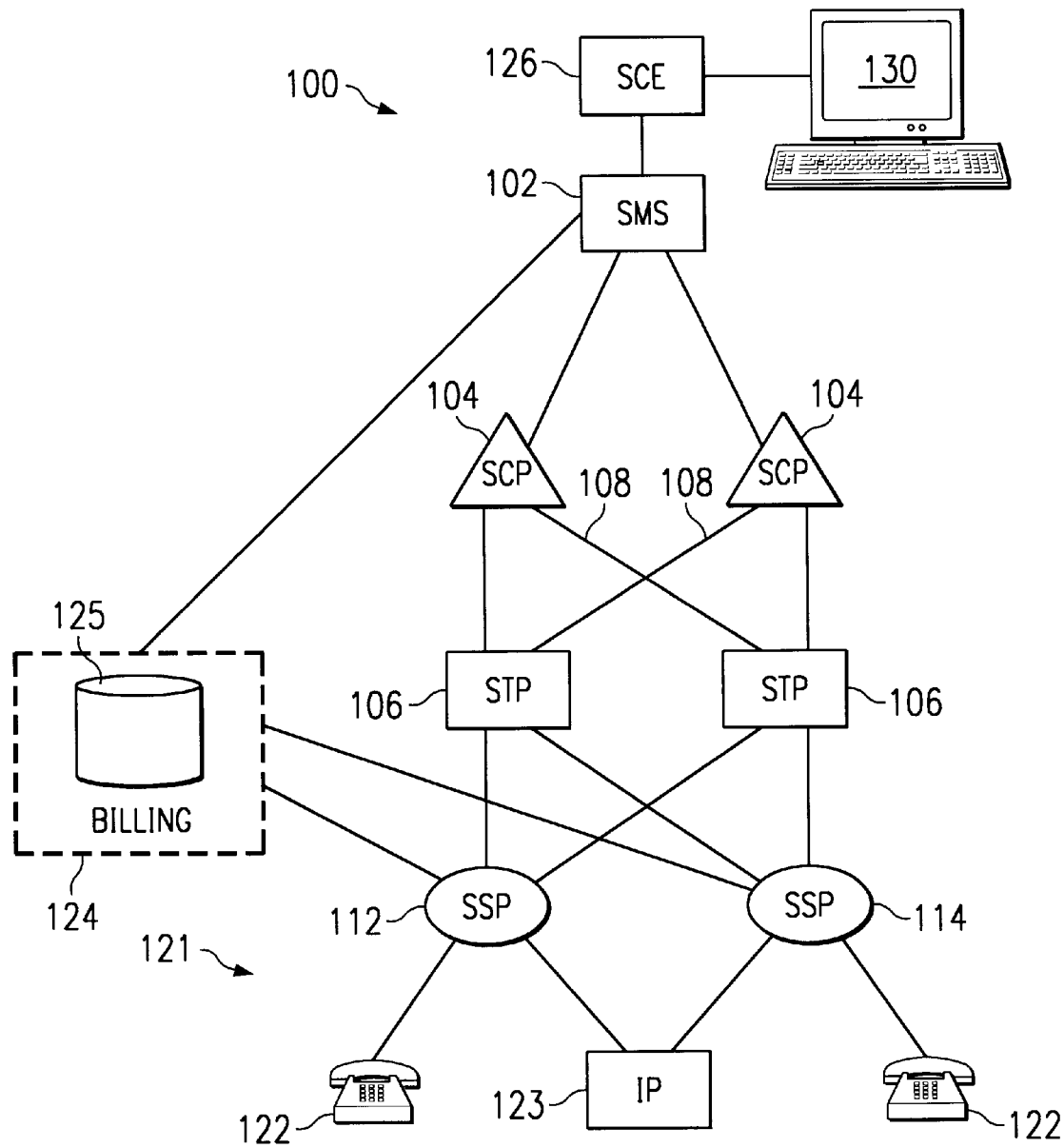
FIG. 1 is a block diagram of a telecommunications network constructed in accordance with one embodiment of the present invention.

FIG. 1 is a block diagram of a telecommunications network 100, such as an advanced intelligent network (AIN). Telecommunications network 100 includes a service management system 102 that interfaces with a plurality of service control points (SCP) 104 and a plurality of signal transfer points (STP) 106 via an industry standard protocol, such as X.25. Service management system 102 provides network information, database management, and administrative support for telecommunications network 100. Service management system 102 generally interfaces with service control points 104 for provisioning, database management, service control point application program management, and collecting traffic metering measurement data.

Service control points 104 may also be directly linked to signal transfer points 106 via a signaling system number 7 (SS7) link set 108. Signal transfer points 106 are further coupled through a signaling system number 7 link set to one or more service switching points 112 and 114, which perform switching and call handling functions in the network. Service control points 104 are transaction based processing systems whose primary responsibility is to respond to queries from service switching points 112 and 114 for data needed to complete routing of a call. Service switching points 112 and 114 are part of the public switched telephone network and are coupled to the customer premises equipment (CPE) of telephone service subscribers or customers 121, which include wire-based telephones and wireless telephones 122 and intelligent peripherals 123.

It will be understood that service control points 104, signal transfer points 106 and service switching points 112 may be functions combined and implemented on one or more platforms rather than discrete points in telecommunications network 100. For example, in one alternative configuration of telecommunications network 100, a plurality of service nodes each contains a service control function and a service switching function. Within a node, the service control function and the service switching function may communicate directly by means of TCAP (transaction capabilities application part) messages without the use of a signal transfer point 106.

Service management system 102 and service switching points 112 and 114 are connected to a billing system 124. Billing system 124 receives information regarding calls, stores the information as call detail records (CDR) in a mass storage device 125, and later uses the information to generate billing information for the customers of network 100. The interaction of billing system 124 with service switching points 112 and 114 will be described more fully below.

A service creation environment 126 allows the creation of service logic programs that may be downloaded to service control points 104 and signal transfer points 106 through service management system 102 for execution. Programmers of service creation environment may interface with service creation environment 126 through a computer terminal coupled to service creation environment 126.

Service independent building blocks (SIBs) are building blocks sometimes used to construct service logic programs to implement network services. These service independent building blocks, as defined in the International Telecommunication Union ITU-T Q.1213, are primarily used in a service creation environment (SCE) 126 through a user interface 130 to produce the service logic programs that are then downloaded to network elements such as service management system 102, service control point 104, and/or signal transfer point 106, where they are executed.

Figure 2:
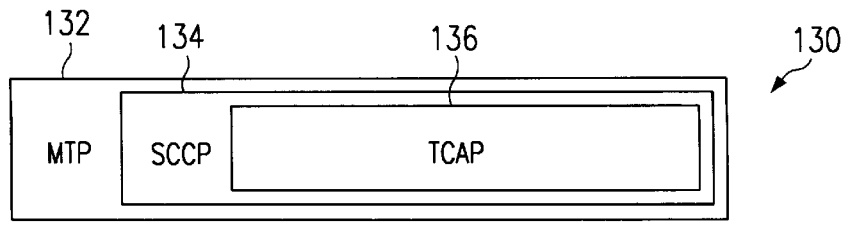
FIG. 2 is a block diagram illustrating an exemplary SS7 message format.

Referring to FIG. 2, an exemplary SS7 message format is illustrated. The message 130 includes a message transfer part (MTP) 132, a signaling connection and control part (SCCP) 134 and a transaction capabilities application part (TCAP) 136.

Figure 3:
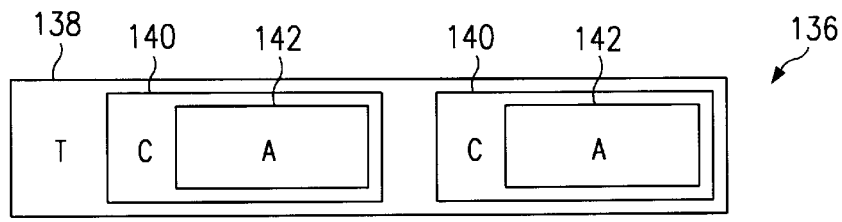
FIG. 3 is a block diagram illustrating an exemplary TCAP message format.

Referring to FIG. 3, an exemplary TCAP message format is illustrated. The TCAP message 136 includes a transaction part 138, one or more component parts 140 and one or more application parts 142. Application parts 142 follow the well known intelligent network application protocol (INAP).

Figure 4:
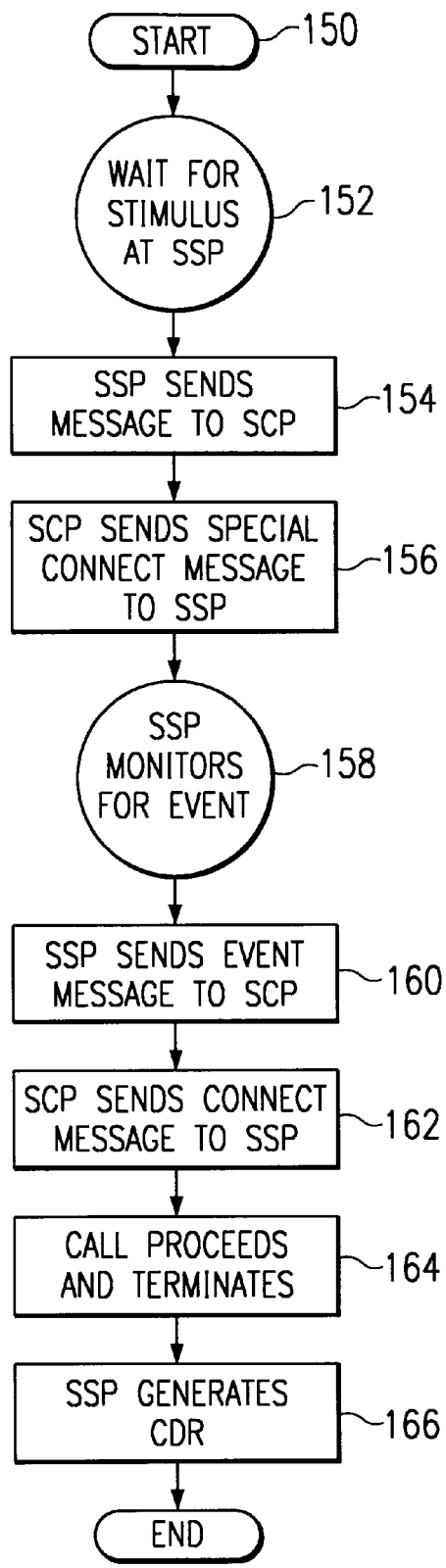
FIG. 4 is a flowchart illustrating a method for generating billing information in accordance with one embodiment of the present invention.

Referring to FIG. 4, a flowchart illustrating a method for generating billing information for a call in accordance with the present invention is shown. The method begins at step 150 and proceeds to wait state 152, where service switching point 112 waits to receive a stimulus, such as an attempt by a customer 121 to initiate a call. When such a stimulus is received, service switching point 112 sends a TCAP initial detection point (IDP) message to a service control point 104 at step 154.

Based on the IDP message, service control point 104 executes a selected service logic program. The service logic program may provide for routing of the call according to the number dialed by the customer 121. The service logic program may also provide various services for which the customer being called has subscribed.

However, before the call is routed and/or services are provided, the service logic program, in accordance with the present invention, determines that a billing record should be created for the call. The service logic program therefore causes a specially formatted TCAP message to be a sent to service switching point 112.

Figure 5:
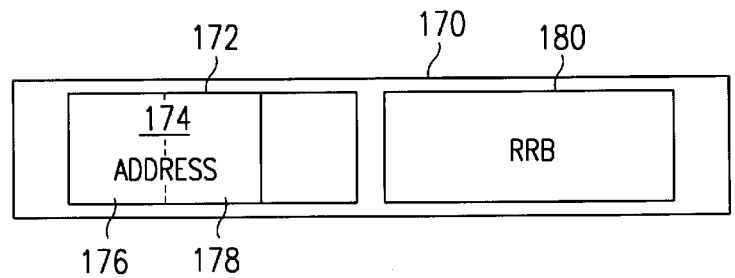
FIG. 5 is a block diagram illustrating a TCAP message formatted in accordance with one aspect of the present invention.

Referring to FIG. 5, a TCAP message 170 formatted in accordance with one aspect of the present invention is shown. TCAP message 170 includes first and second INAP application parts 172 and 180, respectively. Application part 172 is a specially formatted INAP connect message. Following standard INAP connect message format, application part 172 has a 10-digit destination routing address field 174, normally used to provide information regarding the destination of the call. In accordance with one aspect of the present invention, destination routing address field 174 does not contain a destination routing address, but rather contains a billing flag 176 and a billing information field 178.

Billing flag 176 is a unique identifier, not normally found in a destination routing address, that denotes application part 172 as a non-standard INAP connect message. For example, billing flag 176 may be a two-digit string such as "##" that does not normally occur at the beginning of a destination routing address. This flag serves to notify service switching point 112 that application part 172 contains billing information rather than the standard routing information found in an INAP connect message.

Billing information field 178 includes billing information regarding the call awaiting connection. For example, billing information field 178 may include a separate one-bit flag for every service available at service control point 104. Each flag thus denotes whether the service in question is invoked by the call awaiting connection. Examples of such services are toll-free 800-number service, premium-rate 900-number service and calling card service. Billing information field 178 may also contain a flag denoting whether the customer being called is to be billed for the services invoked by the call.

In this example, billing information field 178 may be up to 8 digits in length. Depending on the amount and format of the information included in the field, billing information field 178 may be shorter than the maximum available length.

According to one aspect of the present invention, the billing information may be preferably stored in an unused portion of a call detail record, as will be explained more fully below. Thus, the amount of unused space available in call detail record, which depends on the format used for the call detail record, may also limit the usable length of billing information field 178.

Figure 6:
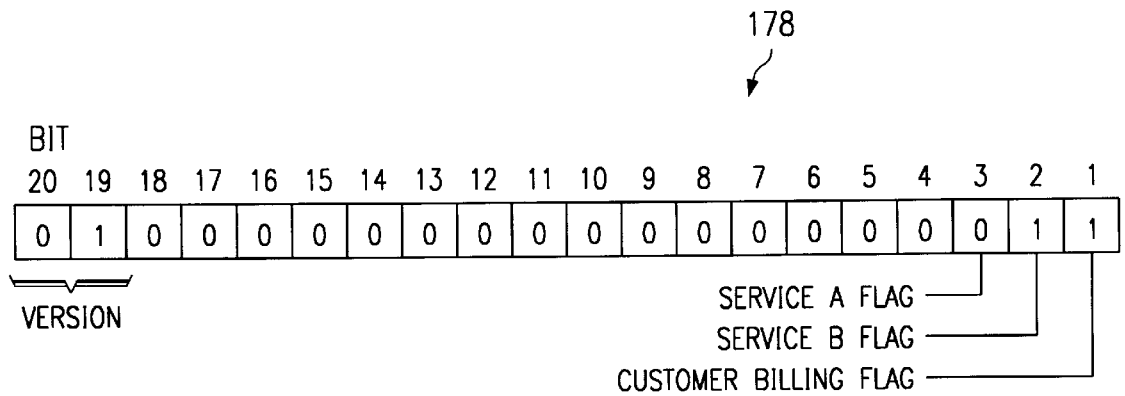
FIG. 6 is an illustration of an exemplary billing information field of the TCAP message.

An exemplary billing information field 178 is shown in FIG. 6. Billing information field 178 is shown as a 20-bit translation of the eight numeric digits stored in billing information field 178. The information in billing information field 178 will be stored in this more useful 20-bit format within a call detail record, as will be described more fully below.

In this example, bit 1 is a customer billing flag, with a value of "1" indicating that the customer being called should be charged for the services invoked during the call. Bit 2 is a flag for Service A, which may be one of the services previously mentioned, or any other telecommunications service. Bit 2 has a value of "1," indicating that Service A is invoked for this call. Bit 3, the flag for Service B, has a value of "0," indicating the Service B is not invoked for this call.

Bits 19 and 20 contain a two-bit version code. This code indicates the meaning of the other bits in billing information field 178. In this case, "Version 01" indicates that bit 1 is the customer billing flag, bit 2 is the Service A flag, and bit 3 is the Service B flag. Other versions may correspond to other service groupings commonly employed in telecommunications network 100. For example, "Version 10" may contain a customer billing flag and flags for Services A, C, D and E. The version code may be occupy any number of bits in billing information field 178, as necessary.

Returning to FIG. 5, INAP application part 180 is a request report basic call state model event (RRB) message. This type of message may be used to request that service switching point 112 monitor the call for an event. In this example, the RRB is a request to monitor the call for a connection failure. Returning to FIG. 4, after sending TCAP message 170, the service logic program causes service control point 104 to wait for service switching point 112 to respond to the RRB request to monitor for connection failure.

Upon receiving the RRB contained in TCAP message 170, service switching system sets an internal timer and waits to see whether the call is connected. However, because service switching point 112 recognized application part 172 as a non-standard connect message that did not contain routing information, no attempt was made to connect the call. Thus, a connection failure event is detected when the internal timer expires.

At step 160, service switching point 112 sends a TCAP event report basic call state model (ERB) message to service control point 104, notifying service control point 104 that the connection failure event occurred. In response to this message, service control point 104 sends a standard TCAP connect message to service switching point 112 at step 162. Proceeding to step 164, the call is routed, connected and terminated normally. Service switching point 112 may monitor the call to gather further billing information, such as the length of the call and any additional services invoked during the call.

After the call terminates, service switching point 112 generates a call detail record reflecting the billing information for the call at step 166. Alternatively, the call detail record may be generated when the billing information is first received at service switching point 112. The call detail record may then be updated as necessary during the call or after the call is completed.

The billing information is preferably included in a previously unused portion of the call detail record, so that no change to the call detail record format is required. The call detail record is sent to billing system 124 for further processing and/or storage in mass storage system 125. For example, billing system 124 may periodically generate a bill for each customer reflecting the billing information contained in the call detail records stored in mass storage system 125. This ends the method illustrated in FIG. 4.

It will be appreciated that this above-described method for generating and storing billing information uses standard SS7 signaling, message protocols and call detail record formats. Thus, the changes that must be made to a telecommunications network to enable this billing method are minimal. The service logic programs at service control points 104 are modified to generate the specially formatted TCAP connect message before generating the standard TCAP connect message. Service switching point 112 is modified to recognize the specially formatted TCAP connect message and respond accordingly. No further modification to telecommunications network 100 is necessary. Thus, any proprietary switch may implement the above-described billing functions at service switching point 112 with only minor modifications.

While the invention has been particularly shown and described by the foregoing detailed description, it will be understood by those skilled in the art that various other changes in form and detail may be made without departing from the spirit and scope of the invention.

What is claimed is:

1. A method for generating billing information for a call in a telecommunications network, comprising the steps of:

receiving a call initiation stimulus at a service switching system;

notifying a service control system of the call initiation stimulus by the service switching system;

generating a first TCAP connect message by the service control system, the TCAP connect message having a destination routing address portion including a billing information tag and customer billing information;

transmitting the first TCAP connect message to the service switching system;

transmitting a response message from the service switching system to the service control system in response to the first TCAP message;

transmitting a second TCAP connect message from the service control system to the service switching system in response to the response message; and generating a billing record by the service switching system in response to the first TCAP connect message.

2. The method of claim 1, wherein the step of generating the billing record comprises the steps of:

passing the customer billing information from the service switching system to a billing system; and generating and storing a call detail record by the billing system.

3. The method of claim 2, wherein the step of generating and storing the call detail record comprises the steps of generating the call detail record including the customer billing information.

4. The method of claim 1, further comprising the step of generating a customer bill by the billing system based upon the billing record.

5. A telecommunications network, comprising:

a service switching system;

a service control system; and a billing system;

the service switching system being operable to receive a call initiation stimulus and to notify the service control system of the call initiation stimulus;

the service control system being operable to generate and transmit to the service switching system a first TCAP connect message having a destination routing address portion including a billing information tag and customer billing information;

the service switching system being further operable to pass the customer billing information to the billing system; and the billing system being operable to generate a billing record in response to the customer billing information.

6. The telecommunications network of claim 5, wherein the billing system is further operable to generate a bill for a customer based upon the billing record.

7. The telecommunications network of claim 5, wherein the billing system further comprises a storage system operable to store the billing record.

\* \* \* \* \*